H. A. WAHLERT.
BRAKE RIGGING FOR RAILWAY TRUCKS.
APPLICATION FILED DEC. 14, 1916.
1,286,845.
Patented Dec. 3, 1918.
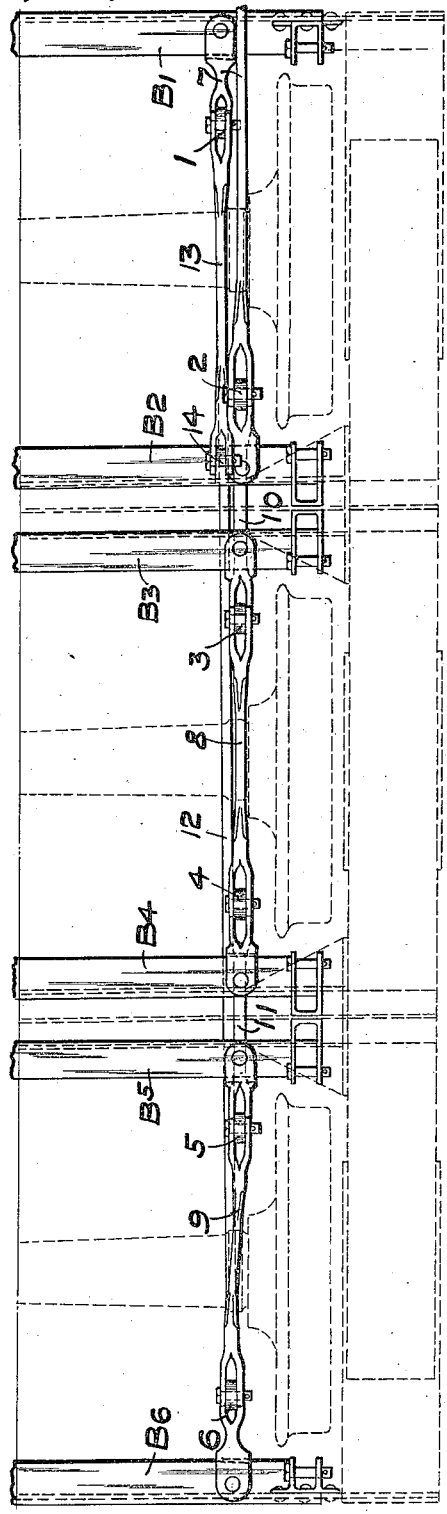
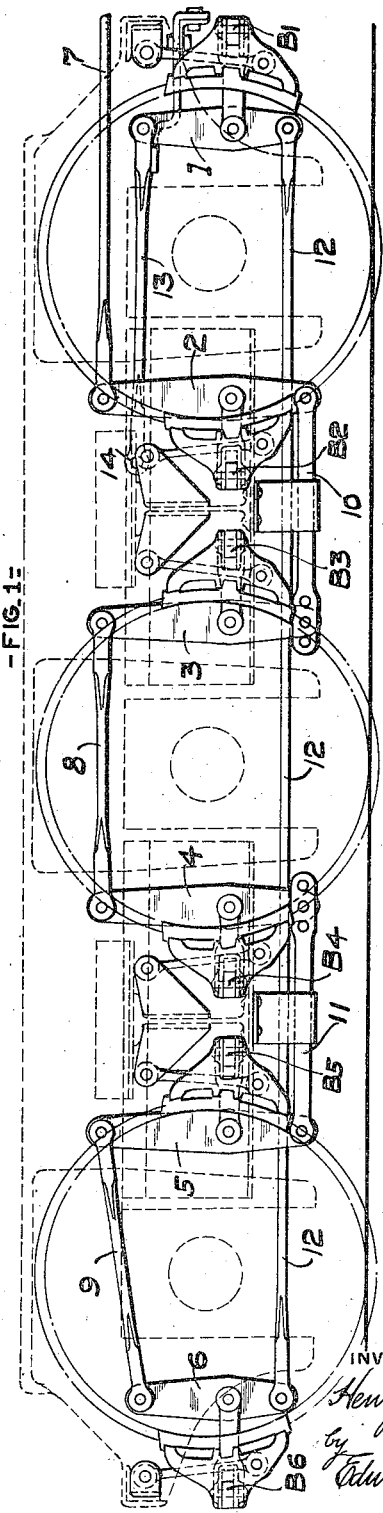
INVENTOR
Henry A. Wahlert
by Edward A. Wright
Atty

UNITED STATES PATENT OFFICE.

HENRY A. WAHLERT, OF ST. LOUIS, MISSOURI, ASSIGNOR TO THE AMERICAN BRAKE COMPANY, OF ST. LOUIS, MISSOURI, A CORPORATION OF MISSOURI.

BRAKE-RIGGING FOR RAILWAY-TRUCKS.

1,286,845.  Specification of Letters Patent.  Patented Dec. 3, 1918.

Application filed December 14, 1916. Serial No. 136,838.

*To all whom it may concern:*

Be it known that I, HENRY A. WAHLERT, a citizen of the United States, residing at St. Louis, in the State of Missouri, have invented a certain new and useful Improvement in Brake-Rigging for Railway-Trucks, of which improvement the following is a specification.

This invention relates to brake rigging of the clasp brake type in which brake shoes are applied to both sides of each pair of wheels, and it has for its object to provide a simple, efficient, and compact rigging which may be readily applied to certain designs of railway trucks, and operate to distribute equalized braking pressure upon all the brake shoes.

In the accompanying drawings: Figure 1 is a side elevation; and Fig. 2, a half plan of one form of brake rigging embodying my improvement as applied to a six wheeled truck.

According to the construction shown, the brake shoes and beams, $B^1$, $B^2$, $B^3$, $B^4$, $B^5$ and $B^6$, are applied to both sides of each pair of wheels, and said beams are pivotally attached at an intermediate point to the respective truck levers, 1, 2, 3, 4, 5 and 6. The pull rod, 7, to which the power is applied to set the brakes, is connected to the upper end of the second or inside truck lever, 2, of the first pair of wheels. The lower ends of the live truck levers, 2 and 3, 4 and 5, of adjacent pairs of wheels are connected at their lower ends by the respective push bars, 10 and 11, while the upper ends of live truck levers, 3 and 4, of the middle pair of wheels, are connected by pull rod, 8, and the upper ends of live truck levers, 5 and 6, of the end pair of wheels, are connected by the pull rod, 9. The lower end of the last live truck lever, 6, is connected to the lower end of the dead truck lever, 1, by the long pull rod, 12, the upper end of said lever, 1, being anchored to the truck frame at 14, by a rod, 13.

The brake beams and shoes are supported by suitable hangers as indicated, and one or two sets of truck levers and rods may be employed.

When power is applied to rod, 7, for setting the brakes, the force is transmitted directly to the second or inside truck lever, 2, of the first pair of wheels, and thence through the push rod, 10, at the bottom, to the next truck lever, 3, then by upper pull rod, 8, to lever, 4, through lower push rod, 11, to lever, 5, upper pull rod, 9, to the end truck lever, 6, and return by long pull rod, 12, to lower end of the dead truck lever, 1, which is anchored to frame at 14, by a rod, 13, attached at its upper end.

It will thus be seen that the system comprises two sets of inside brakes and one set of outside brakes, the forces being equalized throughout, and applying all shoes to the wheels with equal pressure.

The push rods, 10 and 11, as shown, are provided with a plurality of holes for adjusting the lever connection for the purpose of taking up wear.

If but a single set of truck levers and rods be employed, it will obviously be located at the middle of the brake beams, but I prefer the double system having one set located at each side of the truck, as shown.

While I have shown the improvement applied to a six wheeled truck, it will be evident that it is not necessarily limited to such a truck, since it may also be applicable to a truck of four or other number of wheels.

Having now described my invention, what I claim as new and desire to secure by Letters Patent is:

1. A brake rigging for railway trucks, comprising brake beams applied to both sides of each pair of wheels, truck levers for said brake beams, a connection for applying power to the upper end of the inside truck lever of the first pair of wheels, a push bar connecting the lower end of said truck lever with the adjacent truck lever of the next pair of wheels, and a pull rod connecting the outside end truck lever with the first truck lever of the first pair of wheels.

2. A brake rigging for railway trucks, comprising brake beams applied to both sides of each pair of wheels, truck levers for said brake beams, a connection for applying power to the upper end of the inside truck lever of the first pair of wheels, a push bar connecting the lower end of said truck lever with the adjacent truck lever of the next pair of wheels, a pull rod connecting the upper ends of the live truck levers of the next pair of wheels, and a pull rod connecting the outside end truck lever with the first dead truck lever of the system.

3. A brake rigging for trucks, comprising brake beams applied to both sides of each pair of wheels, a truck lever pivotally attached at an intermediate point to each brake beam, push rods connecting the adjacent truck levers of adjoining pairs of wheels, a power connection for the second or inside truck lever of the first pair of wheels, and a pull rod connecting the outside end truck lever with the first truck lever of the first pair of wheels.

4. A brake rigging for trucks, comprising brake beams applied to both sides of each pair of wheels, a truck lever pivotally attached at an intermediate point to each brake beam, push rods connecting the adjacent truck levers of adjoining pairs of wheels, a power connection for the second or inside truck lever of the first pair of wheels, pull rods connecting the live truck levers of the other pairs of wheels respectively, and a pull rod connecting the outside end truck lever with the first truck lever of the first pair of wheels.

In testimony whereof I have hereunto set my hand.

HENRY A. WAHLERT.

Copies of this patent may be obtained for five cents each, by addressing the "Commissioner of Patents, Washington, D. C."